US010450695B2

(12) United States Patent
Dosier et al.

(10) Patent No.: US 10,450,695 B2
(45) Date of Patent: Oct. 22, 2019

(54) COMPOSITIONS AND METHODS OF BIOLOGICALLY CEMENTED STRUCTURES FOR MARINE APPLICATIONS

(71) Applicant: Biomason, Inc., Research Triangle Park, NC (US)

(72) Inventors: Ginger K. Dosier, Raleigh, NC (US); J. Michael Dosier, Raleigh, NC (US); Steven W. McAllister, Durham, NC (US)

(73) Assignee: BioMason, Inc., Research Triangle Park, NC (US)

( * ) Notice: Subject to any disclaimer, the term of this patent is extended or adjusted under 35 U.S.C. 154(b) by 0 days.

(21) Appl. No.: 15/962,534

(22) Filed: Apr. 25, 2018

(65) Prior Publication Data

US 2018/0305858 A1 Oct. 25, 2018

Related U.S. Application Data

(60) Provisional application No. 62/489,528, filed on Apr. 25, 2017.

(51) Int. Cl.
| | | |
|---|---|---|
| *D06P 3/79* | (2006.01) | |
| *D06M 16/00* | (2006.01) | |
| *D06M 11/155* | (2006.01) | |
| *A01K 61/54* | (2017.01) | |
| *D06M 13/432* | (2006.01) | |
| *A01K 80/00* | (2006.01) | |

(52) U.S. Cl.
CPC ........... *D06M 16/003* (2013.01); *A01K 61/54* (2017.01); *D06M 11/155* (2013.01); *D06M 13/432* (2013.01); *A01K 80/00* (2013.01)

(58) Field of Classification Search
CPC .. D06M 16/003; D06M 13/342; D06M 13/00; D06M 7/00; D06M 10/08; D06M 15/3562; D06M 2101/00
See application file for complete search history.

(56) References Cited

U.S. PATENT DOCUMENTS

| | | | |
|---|---|---|---|
| 4,617,326 | A | 10/1986 | Bjornberg et al. |
| 5,891,205 | A | 4/1999 | Picardi et al. |
| 6,348,147 | B1 | 2/2002 | Long |
| 8,182,604 | B2 | 5/2012 | Kucharski et al. |
| 8,420,362 | B2 | 4/2013 | Crawford et al. |
| 8,728,365 | B2 | 5/2014 | Dosier |
| 8,912,244 | B2 | 12/2014 | Vitomir et al. |
| 8,932,400 | B2 | 1/2015 | Chen et al. |
| 8,951,786 | B1 | 2/2015 | Dosier |
| 9,074,134 | B2 | 7/2015 | Bang et al. |
| 9,199,880 | B2 | 12/2015 | Dosier |
| 9,428,418 | B2 | 8/2016 | Dosier |
| 9,796,626 | B2 | 10/2017 | Dosier |
| 2005/0103204 | A1 | 5/2005 | Halliday et al. |
| 2010/0210745 | A1* | 8/2010 | McDaniel ............. C09D 5/008 521/55 |
| 2011/0011303 | A1 | 1/2011 | Jonkers |
| 2012/0199046 | A1 | 8/2012 | Jonkers |
| 2013/0112114 | A1 | 5/2013 | Jonkers |
| 2013/0196419 | A1 | 8/2013 | Chavez Crooker |
| 2014/0239535 | A1 | 8/2014 | Dosier |
| 2014/0369749 | A1 | 12/2014 | Friedman et al. |
| 2016/0090328 | A1 | 3/2016 | Wiktor et al. |
| 2016/0174530 | A1 | 6/2016 | Barber |
| 2016/0264463 | A1 | 9/2016 | Dosier |
| 2017/0190617 | A1 | 7/2017 | Hill et al. |
| 2018/0118623 | A1 | 5/2018 | Smith |

FOREIGN PATENT DOCUMENTS

| | | |
|---|---|---|
| CA | 2591097 | 6/2006 |
| CN | 1807358 | 7/2006 |
| CN | 101270369 | 9/2008 |
| EP | 0388304 | 9/1990 |
| EP | 0631998 | 1/1995 |
| EP | 1838642 | 10/2007 |
| EP | 1893546 | 3/2008 |
| EP | 2082999 | 7/2009 |
| EP | 2247551 | 11/2010 |
| EP | 2297062 | 3/2011 |
| EP | 2429970 | 3/2012 |
| EP | 2462232 | 6/2012 |
| JP | 5284646 | 9/2013 |
| WO | WO2006/066326 | 6/2006 |
| WO | WO2007/070706 | 6/2007 |

(Continued)

OTHER PUBLICATIONS

PCT Search and Patentability Report for PCT/US2018/29378, dated Aug. 30, 2018.
Le Metayer-Levrel G, et al, "Applications of bacterial carbontogeesis to the protection and regeneration of limestones in building and historic patrimony," Sedimentary Geology, Jul. 31, vol. 126, No. 1, pp. 26, 29, 32-33 (1999).
Microbiologically Induced Sealant for Concrete Cracks, J. Day et al., (http://www.ce.washington.edu/em2003/proceedings/papers/352.pdf) 2003.
Bio-Mediated Soil Improvement, Jason T. DeJong et al., Ecological Engineering pp. 197-210 Elsevier 2009.
Microbially Induced Cementation to Control Sand Response to Undrained Shear, Jason T. DeJong et al., Journal of Geotechnical and Geoenvironmental Engineering, pp. 1381-1392, Nov. 2006.
Bacteriogenic Mineral Plugging, F.G. Ferris et al., Petroleum Society of CIM and CAMET, Paper No. 11, pp. 11-0 to 11-12 (1991).

(Continued)

*Primary Examiner* — Eisa B Elhilo
(74) *Attorney, Agent, or Firm* — Remenick PLLC

(57) ABSTRACT

The invention is directed to kits, compositions, tools and methods for biologically cemented structures. More particularly, the invention is directed to materials and methods for the farming of bivalves, such as oysters and clams, and also other marine and fresh water invertebrates such as sponges, and other commercially worthwhile sessile organisms. The kits, compositions, tools and methods of the invention are also applied to erosion control of beaches and underwater surfaces, for the formation of foundations such as footings for pier supports, marine walls and other desirable structures.

34 Claims, No Drawings

(56) References Cited

FOREIGN PATENT DOCUMENTS

| WO | WO2008120979 | 10/2008 |
|----|--------------|---------|
| WO | WO2009/093898 | 7/2009 |
| WO | WO2010/130712 | 11/2010 |
| WO | WO2011126361 | 10/2011 |
| WO | WO2014185781 | 11/2014 |
| WO | WO2015042031 | 3/2015 |
| WO | WO2015155769 | 10/2015 |
| WO | WO2016010434 | 1/2016 |

OTHER PUBLICATIONS

Biologically Induced Improvement of Loose Sand, M.B. Fitzgerald et al., Proceeding of 8th U.S. National Conference on Earthquake Engineering, Paper No. 1691, Apr. 2006.
A New Method for Controlling Leaching through Permeable Channels, U.K. Gollapudi et al., Chemosphere vol. 30(4):695-705, 1995.
A Novel Method of Sand Consolidation through Bacteriogenic Mineral Plugging, A. Kantzas et al., Petroleum Society of CIM, Paper No. CIM 92-46 (1996).
Microbial Carbonate Precipitation in Construction Materials; A Review Wm. deMuynck et al. Ecological Engineering 36: 118-136 (2010).
Modification of Porous Media Permeability using Calcium Carbonate Produced Enzymatically in situ M. Nemati et al., Enzyme and Microbial Technology 33:635-642 (2003).
Microbiological Precipitation of $CaCo_3$ S. Stocks-Fischer et al., Soil Biology and Biochemistry 31:1563-1571 (1999).
Microbial Carbonate Precipitation as a Soil Improvement Technique V.S. Whiffin et al., Geomicrobiology Journal 24:417-423 (2007).
Microbial $CaCo_3$ Precipitation for the Production of Biocement V.S. Whiffin, Doctoral Dissertation, Murdoch University Sep. 2004.
Ibtisam A. Hammad et al., Urease activity and induction of calcium carbonate precipitation by Sporosarcina pasteurii NCIMB 8841; Journal of Applies Sciences Research 9(3): 1525-33, 2013.
Talaiekhozani et al., "Application of Proteus mirabilis and Proteus vulgaris mixture to design self-healing concrete", Desalination and Water Treatment, 2014, vol. 52, pp. 3623-3630.
Meyer et al., "Microbiologically-Induced Soil Stabilization: Application of Sporosarcina pasteurii for Fugitive Dust Control", Geo-Frontiers Congress 2011, pp. 4002-4011.
Stabnikov et al., "Immobilization of Sand Dust and Associated Pollutants Using Bioaggregation", Water, Air, & Soil Pollution, 2013, vol. 224, 1631.
Park et al., "Effect of Plant-Induced Calcite Precipitation on the Strength of Sand", Journal of Materials in Civil Engineering, 2014, vol. 26, Issue 8.
Bang et al., "Calcite precipitation induced by polyurethane immobilized Bacillus pasteurii", Enzyme and Microbial Technology, 2001, vol. 28, pp. 404-409.
Zeolite as a Binding Agent for Ammonia Ions and as a Soil Additive. Part 1 Amonnia Adsorption by the Zeolite, Proceedings of the 5th Serbian-Croatian-Slovenian Symposium on Zeolites, *J. Milovanovic et al.*, May 2013.
Through the Sandglass, (http://throughthesandglass.typepad.com/through_the_sandglass/2010/07/sandbacteriaurinebricks-continuing-performances-of-bacillus-pasteurii.html) Jul. 19, 2010.
Bio-Mediated Soil Improvement, J.T. DeJong et al., Ecological Engineering 36:197-210-(1997).
Application of Bacteria as Self-Healing Agent for the Development of Sustainable Concrete, H.M. Jonkers et al., Ecological Engineering 36:230-235, 2010.
Remediation of Concrete Using Microorganisms, S.K. Ramachandran et al., ACI Materials Journal Jan./Feb. 2001.
The Better Brick, 2010 Next Generation Winner (https://www.metropolismag.com/uncategorized/the-better-brick-2010-next-generation-winner/).

\* cited by examiner

COMPOSITIONS AND METHODS OF BIOLOGICALLY CEMENTED STRUCTURES FOR MARINE APPLICATIONS

REFERENCE TO RELATED APPLICATIONS

This application claims priority to U.S. Provisional Application No. 62/489,528 filed Apr. 25, 2018, the entirety of which is hereby incorporated by reference.

BACKGROUND

1. Field of the Invention

The invention is directed to kits, compositions, tools and methods for biologically cemented structures. More particularly, the invention is directed to materials and methods for biologically cemented structures for use underwater. These structures can be used for the farming of bivalves, such as oysters and other commercially worthwhile sessile organisms; coral reef restoration, and for erosion control of underwater surfaces.

2. Description of the Background

Sessile organisms are creatures, which may be animals or plants, that permanently attached to solid objects at some stage of their life cycles. Sessile organisms include the bivalves, the brachiopods, the sponges, the hydra, and many others. Organisms such as coral are sessile and lay down their own substrate from which they grow. Other organisms such as sponges, kelp, bivalves and hydra grow from solids such as rocks, tree trunks, or artificial objects such as sunken ships, cement structures, or most anything found in the marine environment.

Bivalves and Brachiopods are classes of marine and freshwater organisms with laterally compressed bodies enclosed by a shell consisting of two hinged parts. Bivalves as a group include the clams, oysters, cockles, mussels, scallops, and numerous other families that live in saltwater, as well as a number of families that live in brackish or freshwater.

Many bivalves attach themselves to rocks or other hard surfaces by byssus threads composed of keratin and proteins. Some bivalves, such as the scallops and file shells, can swim whereas others live within wood, clay, or stone structures. Most Brachiopods attach to hard surfaces by means of a cylindrical pedicle or stalk that has a chitinous cuticle which protrudes through an opening. Lophotrochozoan, one group of Brachiopods, have hard valves or shells on the upper and lower surfaces, unlike the left and right arrangement in bivalve mollusks. Brachiopod valves are hinged at the rear end, while the front can be opened for feeding or closed for protection. The majority of these organisms are filter feeders with gills for feeding and breathing. The shells of bivalves and brachiopods, the outer structure of coral, and the attachment points of brachiopods are typically composed of calcium carbonate, also referred to as calcite. Adult shell sizes of bivalves vary from fractions of a millimeter to over a meter in length.

Sessile organisms, especially bivalves, have long been a part of the diet of human populations. In particular, oysters are an important source of bivalves for food, decorations such as pearls and jewelry, and in the biocontrol of pollution. Knowledge of the reproductive cycles of these organisms has led to the development of hatcheries and culture techniques. Many of these techniques involve locating existing solid surfaces for attachment. Often existing solids are not in convenient or optimal locations for underwater farming. Furthermore, attachment techniques to existing surfaces tend to be highly inefficient, with the loss of significant percentages of the initial population during seeding.

Harvesting by conventional ocean farming techniques results in high mortalities which is highly inefficient. Mortality rates during harvest are, in part, due to the difficulties in recovery of the organisms from underwater structures which invariably involves destruction of the solid support. Organisms are necessarily damaged or destroyed by these harvesting techniques as well. These inefficiencies in cultivation are also caused by non-uniform distribution during attachment resulting in stunted growth and/or increasing mortality during the growth period, especially in areas of high density. Non-even distribution results in a lack of nutrients for dense populations, which adversely impacting production efficiencies. A need exists for tools and methods that do not adversely impact and instead favor the large scale growth and development of underwater organisms without the problems associated with high density growth and inefficient recovery.

SUMMARY OF THE INVENTION

The present invention overcomes problems and disadvantages associated with current strategies and designs, and provides new tools, compositions, and methods for underwater marine structures that can be used as attachment surfaces such as marine farming.

One embodiment of the invention is directed to a solid structure, preferable a fabric, containing spores of urease-producing cells, urease-producing cells, and/or urease enzymes. Preferably the fabric is comprised of organic and/or inorganic material such as, for example, burlap or a polymer. Preferably the spores of urease-producing cells, urease-producing cells, and/or urease enzyme comprise or are derived from bacteria such as, for example, *Sporosarcina pasteurii, Sporosarcina ureae, Proteus vulgaris, Bacillus sphaericus, Myxococcus xanthus, Proteus mirabilis, Helicobacter pylori*, or variants, serotypes, genetic modifications, mutations or combinations thereof. Preferably the fabric is stiffened with calcite that is produced by the bacteria. Also preferably, the fabric contains a coloring or identifiable agent.

Another embodiment of the invention comprises the fabric of the invention, further containing sessile organisms. Preferable the sessile organisms are bivalves such as immature of larval stages of oysters or clams, coral polyps, larval stages of sponges or anemones, or another suitable marine invertebrate.

Another embodiment of the invention comprises methods for the manufacture of a fabric that contains spores of urease-producing bacteria, comprising: providing a fabric; placing the fabric in an aqueous solution containing a nitrogen source and a calcium source; adding a culture of spores of urease-producing bacteria to the aqueous solution; and incubating the fabric with the aqueous solution containing the spores for a period of time to produce calcite within the fabric to create a desired level of fabric stiffness. Preferably the fabric comprises jute, hemp, sisal, burlap, paper, wood, plastic, a polymer, or a combination thereof. Preferably the nitrogen source comprises urea, and the calcium source comprises calcium chloride or calcium carbonate. Preferably the stiffened fabric is cultured with sessile organisms and placed in a marine environment for a period of time to allow the oysters or polyps to grow and develop.

Another embodiment of the invention is directed to methods of farming oysters comprising: providing a fabric; placing the fabric in an aqueous solution containing a nitrogen source and a calcium source; adding a culture of spores of urease-producing bacteria to the aqueous solution; incubating the fabric with the aqueous solution containing the spores for a period of time; exposing the incubated fabric to polyps of oysters for a period of time to promote attachment of the polyps to the fabric; and placing the fabric in a marine environment for a period of time. Preferably the fabric is collected after the period of time and the oysters harvested.

Another embodiment of the invention is directed to kits for farming oysters in a marine environment comprising a fabric impregnated with urease producing bacteria and oyster polyps.

Another embodiment of the invention is directed to tools, compositions, kits and methods for erosion control or prevention comprising: providing a fabric; placing the fabric in an aqueous solution containing a nitrogen source and a calcium source; adding a culture of spores of urease-producing bacteria to the aqueous solution; incubating the fabric with the aqueous solution containing the spores for a period of time to produce calcite within the fabric to create a desired level of fabric stiffness; placing the fabric on an object fully or partially or periodically underwater and subject to erosion; and allowing the culture to produce calcite or other polymorphs of calcium carbonate thereby controlling or preventing erosion of the object.

Another embodiment of the invention is directed to tools, compositions and methods for the creation and/or restoration of coral reefs and similar structures. The restoration of coral reefs involve providing a structure (e.g., solid structures or flexible structure such as fabrics) containing urease producing microorganisms; placing the structure in an aqueous solution containing a nitrogen source, preferable urea, and a calcium source; adding a culture of spores of urease-producing bacteria to the aqueous solution; incubating the structure with the aqueous solution containing the spores and/or vegetative cells for a period of time to produce calcite within the structure to create a desired level of calcite formation; adding coral polyps to the structure before, after or simultaneously with the microorganisms; placing the structure on an object fully or partially or periodically underwater; and allowing the culture to produce calcite or other polymorphs of calcium carbonate thereby restoring or growing a coral reef. The structure containing microbes and polyps can be initially incubated under laboratory conditions or applied directly to an underwater environment.

Other embodiments and advantages of the invention are set forth in part in the description, which follows, and in part, may be obvious from this description, or may be learned from the practice of the invention.

DESCRIPTION OF THE INVENTION

Conventional underwater farming often involves culturing large numbers of larvae and spreading those larvae on the ocean floor or in containers within a marine environment. For larvae that require attachment points, spreading is non-uniform which can result in lowered production efficiencies and harvesting difficulties.

It has been surprisingly discovered that solid surfaces can be artificially created for under water farming of commercially valuable organisms. Surfaces are created by providing a solid structure, preferable a fabric, that contains urease-producing organisms. The fabric is preferably a network of natural or artificial fibers. Fibers can also be chosen that will be retained within the structure or that dissolve over time. The fabric may contain a specific design of fibers to create designed growth or may be uniform. The fabric preferably further contains sessile organisms, such as polyps or larval stages of an organism or of different organisms. Sessile organisms include, but are not limited to, polyps or larval forms or coral, oysters, clams, sponges, anemones, or other marine or fresh water invertebrates. Preferable, fabric is chosen to have maximize surface area for adherence of microorganisms and/or sessile organisms. The fabric impregnated with both urease-producing organisms and polyps or larval stages may be maintained under culture conditions to initiate growth before being place under water, preferable in a marine environment, or promptly placed in a natural environment where growth can continue. The urease-producing organisms promote calcite attachment to an object and the sessile organisms allowed to develop in a specific environment. Chemical attractants, nutrients and/or other chemicals needed or desired for growth and development of the underwater organisms can be contained within and/or impregnated into the solid structure. By controlling the dispersal pattern, the organisms can develop quickly and harvested efficiently. The solid structure containing calcite-producing organisms and sessile organism is non-toxic and harmless to the environment, can be created by persons with minimal instruction, and can be applied to most any underwater object. Calcite crystal structures formed by the disclosure herein include calcite crystals and polymorphs thereof such as, for example, aragonite or vaterite. Aragonite is typically formed by biological and physical processes, including precipitation from marine and freshwater environments. Vaterite, like aragonite, is a metastable phase of calcium carbonate at ambient conditions. Although vaterite is less stable than either calcite or aragonite, vaterite has a higher solubility than either of these phases. Upon exposure to water, vaterite converts to calcite at low temperature or aragonite at high temperature such as about 60° C. or greater. At about 37° C., a solution-mediated transition from vaterite to calcite occurs, where the latter one dissolves and subsequently precipitates as calcite. Accordingly, conditions can be tailored to favor formation of calcite, aragonite or vaterite.

One embodiment of the invention is directed to solid structures that contain urease-producing cells, spores of urease-producing cells and/or urease enzymes. Preferably the solid structure is a produced or man-made structure such as, for example, a fabric comprising natural or synthetic materials or both. Preferably the solid structures are stones, sheets, nets, mats, tarps, blankets, three-dimensional forms such as layers, or any structure or form desired. The solid structure may be completely solid or porous as may be desired. Structures such as sheets, nets, tarp or blankets can be draped over and adhered to nearly any underwater structure such as, for example, rocks, or cliffs, or artificial structure such as ships, pipes or cement forms.

The solid structure, in whole or in part, may be flexible, partially stiffened, or otherwise non-flexible or made non-flexible. Preferably, stiffening is accomplished with calcite or another material that impregnates and lodges within the structure. Preferably the solid structure is an organic or an inorganic material which may include, but is not limited to jute, hemp, sisal, burlap, paper, wood, metal, transition metal or metalloid (e.g., Ag, Al, Au, Cu, Fe, Ga. Ni, Si, Sn, Zn), plastic (e.g., polyester, acrylic, nylon, rayon, acetate, spandex, latex, Orlon and Kevlar), a mineral (e.g., Ca), a polymer, or a combination thereof. Preferably urease-producing cells, spores of urease-producing cells, genetically engineered cells, and/or urease enzymes are applied to the solid structure in the form of a liquid, a gel, a sludge, a pump-able slurry, a dry powder and/or crystals.

Preferably the solid structure contains or is impregnated with the urease-producing cells, spores of urease-producing cells and/or genetically modified urease producing cells. Cells and spores have a tendency to adhere to solid structures which can be encouraged by modifications in pH, mineral content, temperature, or salinity of a solution. Cells and spores are preferably bacteria and preferred bacteria include, but are not limited to *Sporosarcina* spp. (e.g., *S. pasteurii* and *S. ureae*), *Proteus* spp. (e.g., *P. vulgaris* and *P. mirabilis*), *Bacillus* spp. (e.g., *B. sphaericus* and *B. megaterium*), *Myxococcus* spp (e.g., *M. xanthus*), *Helicobacter* spp. (e.g., *H. pylori*), or variants, serotypes, mutations, or combinations thereof, and preferred yeast, algae, bacteria or eukaryotic cells or cell spores are genetically engineered. The cells or spores may be attached to the structure via electrostatic bonding, covalent bonding, physical capture (e.g., within individual threads or strands of a fiber or within or between layers).

Solid structures may also contain and preferably are impregnated with sessile organisms of interest. Organisms may be animals or plants such as, for example, kelp, bivalves, brachiopods, oysters, clams, sponges, anemones, and/or coral. The larvae or polyps of these organisms are motile or float in water until locating solid structures to form attachments. Once attached, these organisms develop into adult forms. Preferably the organisms are dispersed evenly across the solid structure to allow for maximum interaction with nutrients from the environment during growth and development, and minimal crowding. Alternatively, organisms may be targeted to specific sites by treating those sites with materials know to attract the organisms thereby forming nucleation sites for attachments. For example, polyps of oysters and coral are attracted to ammonia. By spotting a pattern of ammonia to the solid structure, polyps of oysters or coral will preferable adhere to the pattern.

In another embodiment, solid structures may be formed in a marine environment, such as under water. Foundations, footings, piers and other strictures can be created by incubated an impregnated composition or structure with spores and/or cells of urease-producing organisms. The composition or structure can be maintained in an aqueous growth medium and provided with nutrients, urea, and calcium for a period of time to initiate calcite formation, or, alternatively, placed in a marine environment without an initial growth period and taking advantage of urea, calcium and/or other nutrients that are available in that environment. With or without an initial grown phase, the solid structures continue to harden over time in the marine environment by taking advantage of calcium and other nutrients that are naturally present. These structures can become sufficiently hardened to be suitable as footing for supports for piers, as shore defenses, as breaks for wave action, and/or for other similar purposes.

Additional microorganisms, nutrients and/or chemicals may be included within or attached to the solid structure that include, for example, cells such as yeast, algae, bacteria, spores or eukaryotic cells that support or are otherwise involved in the development of the urease-producing organisms or organisms which are later applied to the solid support to be developed, nutrients for the urease-producing cells or the organisms, and/or stiffening agents. The cells, support materials and nutrients are preferably coupled to the solid support via physical capture, hydrophobic bonding, hydrophilic bonding, ionic bonding, non-ionic bonding, covalent bonding, van der Waal forces, or a combination thereof. Preferably additions to the solid structure are partially or totally encompassed by a material that promotes binding of the urease-producing cells and/or the organisms to be developed. Preferred these additions are film compositions comprising a polymer or a cell nutrient and preferably the composition contains a coloring agent which may be red, blue, green, yellow or any combination or shade thereof. Preferably the composition contains an identifying agent or a detectable marker such as a microscopic tag, a color, a nucleic acid or peptide, an enzyme or another substance.

Another embodiment of the invention is directed to methods for forming a solid structure containing organisms that produce calcite in the presence of a nitrogen source such as urea and a calcium source. Preferably the organisms are urease producing and may be deposited as spores or bacterial cells. Preferably the solid structure is a fibrous sheet such as a netting, a tarp or a blanket. The sheet may be immersed in a solution containing the spores or bacterial and infiltrate the fibers. Preferably sheets containing these bacteria are exposed to a nitrogen source such as preferably urea, and a calcium source, such as preferably calcium chloride, and form calcite or a polymorph such as aragonite or vaterite, within or between fibers or simply upon the structure. The amount of calcite that forms can be regulated by the amount of time the bacteria are provided to form calcite. In this manner, sheets that are otherwise flexible, such as burlap, can be slightly stiffened or completely hardened or anything in between as desired.

Sheets containing urease-producing bacteria may further be treated to contain sessile organisms. Preferably, sheets containing bacteria are exposed to the organism of interest, which adhere or can be made to adhere to the sheets. For example, sheets can be immersed into a solution containing oyster polyps which adhere to the sheets. By gentle rocking or other agitation the polyps can be made to evenly distribute across the sheet. The sheet, which contains both bacteria and polyps can be placed in a marine environment, such as covering a structure. In the marine environment, the sheet will adhere to structure because of the formation of calcite by the bacteria and the polyps can grow and develop into adults. Preferable polyps include, but are not limited to clams, oysters, sponges, and coral. At the appropriate time, the sheets can be removed from the structure thereby harvesting all of the now grown organisms. Harvesting loss are minimized and/or eliminated. By using a coloring agent or other identifiable tag connected to the sheet or produced in the calcite by the bacteria, the sheets can be identified even after long periods of time in a marine environment.

Another embodiment of the invention is directed to kits for manufacturing solid forms comprising: the solid structures of interest, a composition of spores or spore-forming bacteria that produce urease, and a composition of sessile organisms such as polyps of bivalves. By combining the solid structure with the compositions, according to the methods described herein, the solid structure can be an incubator for the growth, development and harvesting of the sessile organisms of interest.

Another embodiment of the invention is the control of erosion using the composition, tools, and methods of the invention. Preferably the compositions tools and method create underwater structures such as, for example, shore defenses, buttresses, wave breaks, marine walls, foundations, footings for pier supports, or fixed piers. Material, which may be organic or inorganic and is preferably a fabric, is preferable impregnated with spores or urease-producing cells of bacteria or another organism, and placed onto underwater objects that are subject to or at risk of erosion. For example, erosion may be caused by wave action, underwater current, microbe activity, or other undersea activity. By placing materials containing urease-producing organisms onto these objects (and optionally other sessile organisms), not only can erosion be inhibited, but actually reversed and calcite added to the object. In addition, by incorporating calcite onto the surfaces of objects, additional minerals or other components present in the material may also be incorporated simultaneously.

The following examples illustrate embodiments of the invention, but should not be viewed as limiting the scope of the invention.

EXAMPLES

Example 1 Generation of Semi-Flexible Burlap

Sheets of burlap of approximately 50 cm square are placed in a solution of *Sporosarcina pasteurii* spores at a uniform density of approximately 10-15 k spores per milliliter. Within a short time, about 30 minutes, the spores adhere to the fibers of the sheets. The now spore impregnated sheets are immersed in a broth containing nutrient media plus a calcium source and a nitrogen source, and allowed to incubate for 6-8 hours a room temperature (about 20-22° C.). After culturing for about 1-2 hours, the spore-impregnated burlap sheets are removed allowed to dry. The dried burlap sheet is less flexible than untreated burlap, but still is sufficiently flexible to be placed over another solid structure.

Example 2 Growth and Recovery of Oysters

Burlap sheets prepared according to Example 1 are immersed in medium containing living oyster polyps for a period of from 1-2 hours with gentle rocking. The polyps impregnate the burlap to saturation and affix themselves to the fabric. The impregnated burlap is molded to rocks or other solid structures in a marine environment. After 8-12 months (prior to maturation), the burlap is harvested and oysters are removed from the burlap with 100% or near 100% recovery.

Example 3 Growth of Coral Polyps

Biocement fiber lattice structures prepared according to Example 1 are immersed in medium containing living coral polyps for a period of time, roughly 1-2 hours, with gentle rocking. The coral polyps impregnate the lattice structure to saturation and affix themselves. The impregnated structure is molded to existing reefs, rocks or other solid structures in a marine environment. After 8-12 months (prior to maturation), the structure becomes entombed with new reef growth.

Example 4 Generation of Semi-Flexible Structure for Shore-line Defense and Erosion Control A woven burlap structure of approximately 50 feet in length is placed in a solution of *Sporosarcina pasteurii* spores at a uniform density of approximately 10-15 k spores per milliliter. Within a short time, about 30 minutes, the spores adhere to the fibers of the burlap. The now spore impregnated rolls are immersed in a broth containing nutrient media plus a calcium source and a nitrogen source, and allowed to incubate for 6-8 hours at room temperature (about 20-22° C.). After culturing for about 1-2 hours, the spore-impregnated burlap sheets are removed and allowed to dry. The dried burlap sheet is less flexible than untreated burlap, but still sufficiently flexible to be molded to existing reefs, rocks, solid structures, or sediments in a marine environment where it continues to harden in the presence of seawater calcium and carbonate ions. Aquatic plants, polyps, and other marine biomes impregnate the burlap and affix themselves to the fabric where continued growth provides additional structural rigidity, density, and thickness. The resulting composite material serves to protect the underlying substrate from erosion and tidal forces.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

The invention claimed is:

1. A fabric containing sessile organisms plus spores of urease-producing cells, urease-producing cells, and/or urease enzymes.

2. The fabric of claim 1, which is comprised of organic, inorganic, natural and/or artificial fibers.

3. The fabric of claim 1, which comprises burlap, hemp, wood and/or recycled organic material.

4. The fabric of claim 1, which comprises a plastic, a polymer and/or recycled inorganic material.

5. The fabric of claim 1, wherein the spores of urease-producing cells, urease-producing cells, and/or urease enzyme comprise or are derived from bacteria or another organism.

6. The fabric of claim 5, wherein the bacteria comprise *Sporosarcina pasteurii, Sporosarcina ureae, Proteus vulgaris, Bacillus sphaericus, Bacillus megaterium, Myxococcus xanthus, Proteus mirabilis, Helicobacter pylori*, or variants, serotypes, mutations or combinations thereof.

7. The fabric of claim 5, wherein bacteria are genetically modified.

8. The fabric of claim 1, which is stiffened with calcite and/or polymorphs of calcium carbonate.

9. The fabric of claim 1, which contains a coloring agent and/or an identifiable agent.

10. The fabric of claim 1, wherein the sessile organisms are polyps or larval forms of coral, clams, oysters and/or sponges.

11. A method for the manufacture of a fabric that contains spores of urease-producing bacteria, comprising:
providing a fabric;
placing the fabric in an aqueous solution containing a nitrogen source and a calcium source;
adding a culture of spores of urease-producing bacteria to the aqueous solution; and
incubating the fabric with the aqueous solution containing the spores for a period of time to produce calcite within the fabric to create a desired level of fabric stiffness.

12. The method of claim 11, wherein the fabric comprises jute, hemp, sisal, burlap, paper, wood, plastic, a polymer, or a combination thereof.

13. The method of claim 11, wherein the nitrogen source comprises urea or ammonia.

14. The method of claim 11, wherein the calcium source comprises calcium chloride.

15. The method of claim 11, further comprising culturing the fabric with sessile organisms before or after incubating.

16. The method of claim 15, wherein the sessile organisms are polyps or larval forms of clams, oysters, coral and/or sponges.

17. The method of claim 15, wherein the fabric containing bacteria and sessile organisms is placed in a marine environment for a period of time to allow the sessile organisms to grow and develop.

18. A method of farming sessile organisms comprising:
providing a fabric;
placing the fabric in an aqueous solution containing a nitrogen source and a calcium source;
adding a culture of spores of urease-producing bacteria to the aqueous solution;
incubating the fabric with the aqueous solution containing the spores for a period of time;
exposing the incubated fabric to polyps of the sessile organisms for a period of time to promote attachment of the polyps to the fabric; and
placing the fabric in a marine environment for a period of time.

19. The method of claim 18, further comprising collecting the fabric after the period of time and harvesting the sessile organisms.

20. The method of claim 19, wherein the sessile organisms are oysters or clams.

21. A kit for farming sessile organisms in a marine environment comprising a fabric impregnated with urease producing bacteria and polyps or larval forms of sessile organisms.

22. A method of erosion control or prevention comprising:
providing a fabric;
placing the fabric in an aqueous solution containing a urea source and a calcium source;
adding a culture of spores of urease-producing bacteria to the aqueous solution;
incubating the fabric with the aqueous solution containing the spores for a period of time to produce calcite within the fabric to create a desired level of fabric stiffness;
placing the fabric on an object fully or partially or periodically underwater; and
allowing the culture to produce calcite thereby controlling or preventing erosion of the object and/or the surrounding area.

23. The method of claim 22, wherein the fabric contains natural and/or artificial fibers.

24. The method of 23, wherein surrounding area is a beach.

25. A fabric containing spores of urease-producing cells, urease-producing cells, and/or urease enzymes, wherein the fabric is stiffened with calcite and/or polymorphs of calcium carbonate.

26. The fabric of claim 25, which is comprised of organic, inorganic, natural and/or artificial fibers.

27. The fabric of claim 25, which comprises burlap, hemp, wood and/or recycled organic material.

28. The fabric of claim 25, wherein the spores of urease-producing cells, urease-producing cells, and/or urease enzyme comprise or are derived from bacteria or another organism.

29. The fabric of claim 25, which comprises a plastic, a polymer and/or recycled inorganic material.

30. The fabric of claim 25, wherein the bacteria comprise *Sporosarcina pasteurii, Sporosarcina ureae, Proteus vulgaris, Bacillus sphaericus, Bacillus megaterium, Myxococcus xanthus, Proteus mirabilis, Helicobacter pylori*, or variants, serotypes, mutations or combinations thereof.

31. The fabric of claim 25, wherein bacteria are genetically modified.

32. The fabric of claim 25, which contains a coloring agent and/or an identifiable agent.

33. The fabric of claim 25, which contains sessile organisms.

34. The fabric of claim 33, wherein the sessile organisms are polyps or larval forms of coral, clams, oysters and/or sponges.

* * * * *